(12) United States Patent
Plant et al.

(10) Patent No.: US 11,928,804 B2
(45) Date of Patent: Mar. 12, 2024

(54) DYNAMIC DEVICE CONFIGURATION

(71) Applicant: KYNDRYL, INC., New York, NY (US)

(72) Inventors: Laurence John Plant, North Balwyn (AU); Jorge Andres Moros Ortiz, Canberra (AU); Mahtab Mirmomeni, Vermont South (AU); Shaila Pervin, North Sydney (AU); Rahil Garnavi, Macleod (AU)

(73) Assignee: KYNDRYL, INC., New York, NY (US)

( * ) Notice: Subject to any disclaimer, the term of this patent is extended or adjusted under 35 U.S.C. 154(b) by 346 days.

(21) Appl. No.: 17/509,804

(22) Filed: Oct. 25, 2021

(65) Prior Publication Data

US 2023/0130368 A1 Apr. 27, 2023

(51) Int. Cl.
*G06T 7/00* (2017.01)
*G06N 5/045* (2023.01)
*H04L 12/28* (2006.01)

(52) U.S. Cl.
CPC ........... *G06T 7/0002* (2013.01); *G06N 5/045* (2013.01); *G06T 7/97* (2017.01); *H04L 12/2818* (2013.01);
(Continued)

(58) Field of Classification Search
CPC .............. G06T 7/0002; G06T 7/97; G06T 2207/10144; G06T 2207/10148;
(Continued)

(56) References Cited

U.S. PATENT DOCUMENTS 8,228,413 B2   7/2012   Ellenby et al.
8,332,429 B2   12/2012  Poirier et al.
(Continued)

FOREIGN PATENT DOCUMENTS

CN   103619232 B   7/2016
CN   105578059 B   4/2019
(Continued)

OTHER PUBLICATIONS

Mell et al., "The NIST Definition of Cloud Computing", NIST, Special Publication 800-145, Sep. 2011, 7 pages.
(Continued)

*Primary Examiner* — Huy C Ho
(74) *Attorney, Agent, or Firm* — Dan Housley; Andrew M. Calderon; Calderon Safran & Cole P.C.

(57) ABSTRACT

A method includes receiving, by a computing device, device information for a user device and user environment devices; sending, by the computing device, image templates to the user device using the device information; adjusting, by the computing device, device settings on the user device and the user environment devices in response to a selection of an image template of the image templates; receiving, by the computing device, an image from the user device; comparing, by the computing device, the image to a target image; determining, by the computing device, the image is acceptable; and in response to determining the image is acceptable, sending, by the computing device, the acceptable image to a third party.

20 Claims, 5 Drawing Sheets

(52) U.S. Cl.
CPC ............... *G06T 2207/10144* (2013.01); *G06T 2207/10148* (2013.01); *G06T 2207/10152* (2013.01)

(58) Field of Classification Search
CPC . G06T 2207/10152; G06T 2207/20081; G06T 2207/30004; G06T 2207/30168; G06N 5/045; G06N 3/045; G06N 3/047; G06N 3/0475; G06N 3/094; H04L 12/2818
USPC ......................................................... 382/103
See application file for complete search history.

(56) References Cited

U.S. PATENT DOCUMENTS

| | | | |
|---|---|---|---|
| 9,384,422 B2* | 7/2016 | Di | ............................ G06F 16/60 |
| 9,445,713 B2 | 9/2016 | Douglas et al. | |
| 9,779,492 B1 | 10/2017 | Garnavi et al. | |
| 10,334,158 B2 | 6/2019 | Gove | |
| 11,310,122 B2* | 4/2022 | Jones | .................. H04L 41/5045 |
| 2005/0124375 A1 | 6/2005 | Nowosielski | |
| 2006/0184393 A1 | 8/2006 | Ewin et al. | |
| 2010/0182136 A1 | 7/2010 | Pryor | |
| 2010/0255795 A1 | 10/2010 | Rubinsky et al. | |
| 2012/0086825 A1 | 4/2012 | Yost et al. | |
| 2014/0378810 A1* | 12/2014 | Davis | .................... G06F 16/245 600/407 |
| 2020/0104998 A1 | 4/2020 | Dacosta | |
| 2020/0304650 A1 | 9/2020 | Roach et al. | |

FOREIGN PATENT DOCUMENTS

| | | |
|---|---|---|
| WO | 2013001265 A2 | 1/2013 |
| WO | 20116174659 A1 | 11/2016 |

OTHER PUBLICATIONS

Disclosed Anonymously, "Method and System for Providing Recommendations/Feedback to a Photographer for Clicking Photograph of a User as Per the User's Preference," IP.com No. IPCOM000257908D, Mar. 22, 2019, 4 pages.

Disclosed Anonymously, "Optimizing Settings for Image Capture," IP.com No. IPCOM000237841D, Jul. 16, 2014, 8 pages.

Disclosed Anonymously, "System and Method for Adaptive Recommendation of Background for Clicking Image, Along with Identification of Person and Camera Position," IP.com No. IPCOM000254710D, Jul. 24, 2018, 6 pages.

Disclosed Anonymously, "Systems and Methods for Adjusting Lighting to Improve Image Quality," IP.com No. PCOM000255201D, Sep. 10, 2018, 24 pages.

* cited by examiner

DYNAMIC DEVICE CONFIGURATION

BACKGROUND

Aspects of the present invention relate generally to computing devices and, more particularly, to dynamic device configuration.

Healthcare providers provide medical advice to patients for a medical condition. The advice can include instructions, recommendations, and prescriptions, in view of a diagnosis of the condition. Sometimes, to diagnose medical conditions, patients go to a healthcare facility and take images, which assist in diagnosing the medical condition.

SUMMARY

In a first aspect of the invention, there is a computer-implemented method including: receiving, by a computing device, device information for a user device and user environment devices; sending, by the computing device, image templates to the user device using the device information; adjusting, by the computing device, device settings on the user device and the user environment devices in response to a selection of an image template of the image templates; receiving, by the computing device, an image from the user device; comparing, by the computing device, the image to a target image; determining, by the computing device, the image is acceptable; and in response to determining the image is acceptable, sending, by the computing device, the acceptable image to a third party.

In another aspect of the invention, there is a computer program product including one or more computer readable storage media having program instructions collectively stored on the one or more computer readable storage media. The program instructions are executable to: receive device information from a user device and from user environment devices; send image templates to the user using the device information; adjust device settings on the user device and the user environment devices in response to a selection of an image template of the image templates; receive an image from the user device; compare the image to a target image; determine the image is not acceptable; and in response to determining the image is not acceptable, send a notification message to the user device.

In another aspect of the invention, there is system including a processor, a computer readable memory, one or more computer readable storage media, and program instructions collectively stored on the one or more computer readable storage media. The program instructions are executable to: generate image templates using a machine learning model; send the image templates to a user device in response to receiving device information of the user device; adjust device settings on the user device in response to a selection of an image template of the image templates; receive an image from the user device; compare the image to a target image; determine the image is acceptable; send the acceptable image to a third party; and train the machine learning model with the acceptable image.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
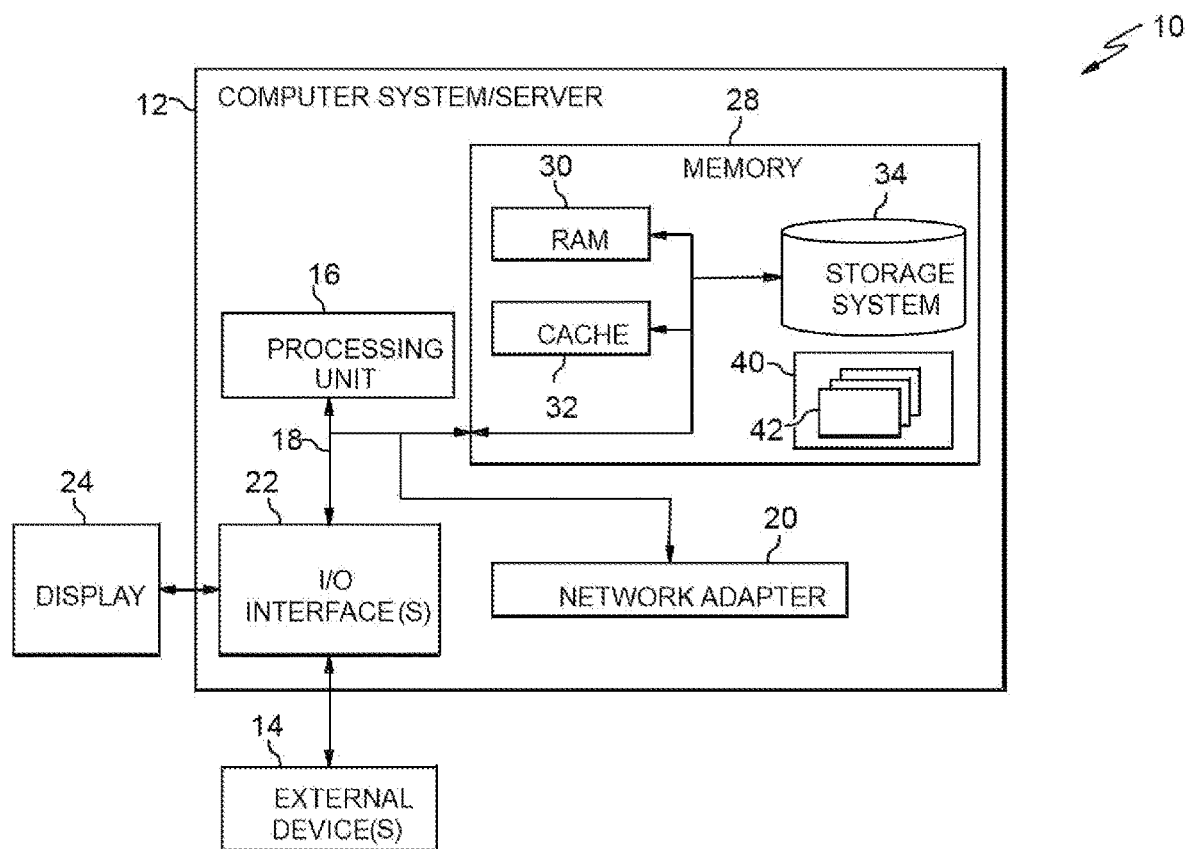
FIG. 1 depicts a cloud computing node according to an embodiment of the present invention.

Aspects of the present invention relate generally to computing devices and, more particularly, to dynamic device configuration. According to aspects of the invention, a user has a medical condition which needs a diagnosis. In embodiments, the systems and processes allow the user to capture optimal images for a specific context using a user device. Specifically, the systems and processes guide the user in adjusting the user device to capture images which satisfy requirements of a target image. In response to receiving the images from the user device, the systems and processes determine whether the images comply with the requirements. In response to determining the images comply, the systems and processes send the images to a third party. In this manner, implementations of the invention allow for a user to independently use their user device to capture optimal images.

In embodiments, the systems and processes provide a solution to assist and guide users in capturing a relatively best possible image based on user device specifications available and a target image. In embodiments, when the image is of a medical context or a legal context which may have relatively strict requirements, the systems and processes provide a computational method to review and accept the image, resulting in relatively better imaging data for healthcare clinicians and artificial intelligence models. In embodiments, when the image is of a leisure context, the systems and processes provide guidance and explanations to the user in relation to changes in lighting and device settings to achieve a particular photographic look, resulting in a relatively fun and interactive educational experience.

In embodiments, the systems and processes change a user's ambient lighting environment and device settings based on a selected image to be taken (e.g., a medical context ABC, or a legal context ABC, or a leisure context), where a position and a distance in space from a target to be photographed offers a guidance to the user in the form of various multi-sensory inputs, such as but not limited to: a haptic input on the device, an audio message, and/or a text to speech message, amongst other examples. In embodiments, the systems and processes interchange various filters and settings on various devices (based on their specifications to replicate an optimal environment for an image/video capture), while the user is being guided in space. In a regulated image context (e.g., a medical context, a legal context) the image is computationally accepted by benchmarking pixel comparison and using a threshold of acceptance. In a leisure context, the system uses an explainable artificial intelligence (AI) module to detail why the device settings pertaining to image capture have been changing as it learns from the user's interaction with the device and the environment to explain why a photographer would do those changes (e.g., increasing filter A to give more shadows and achieve a closer look to the target image corresponding to the image template selection).

Implementations of the invention allow for a practical application of a user taking an image which satisfies requirements of a target image. In embodiments, the systems and processes described herein utilize deeply rooted computing technology including artificial intelligence to assist and guide a user in capturing images based on available device specifications and a target image. In embodiments, guiding the users includes providing a haptic input on the device, an audio message to the user device, and/or a text to speech message to the user device, amongst other guidance. In further embodiments, the systems and processes change environmental settings of a user to further capture an image which satisfies requirements of a target image. Accordingly, the systems and processes described herein provide the practical application of allowing a user to capture an image which satisfies requirements of a target image in a specific context.

It should be understood that, to the extent implementations of the invention collect, store, or employ personal information provided by, or obtained from, individuals (for example, a medical condition), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
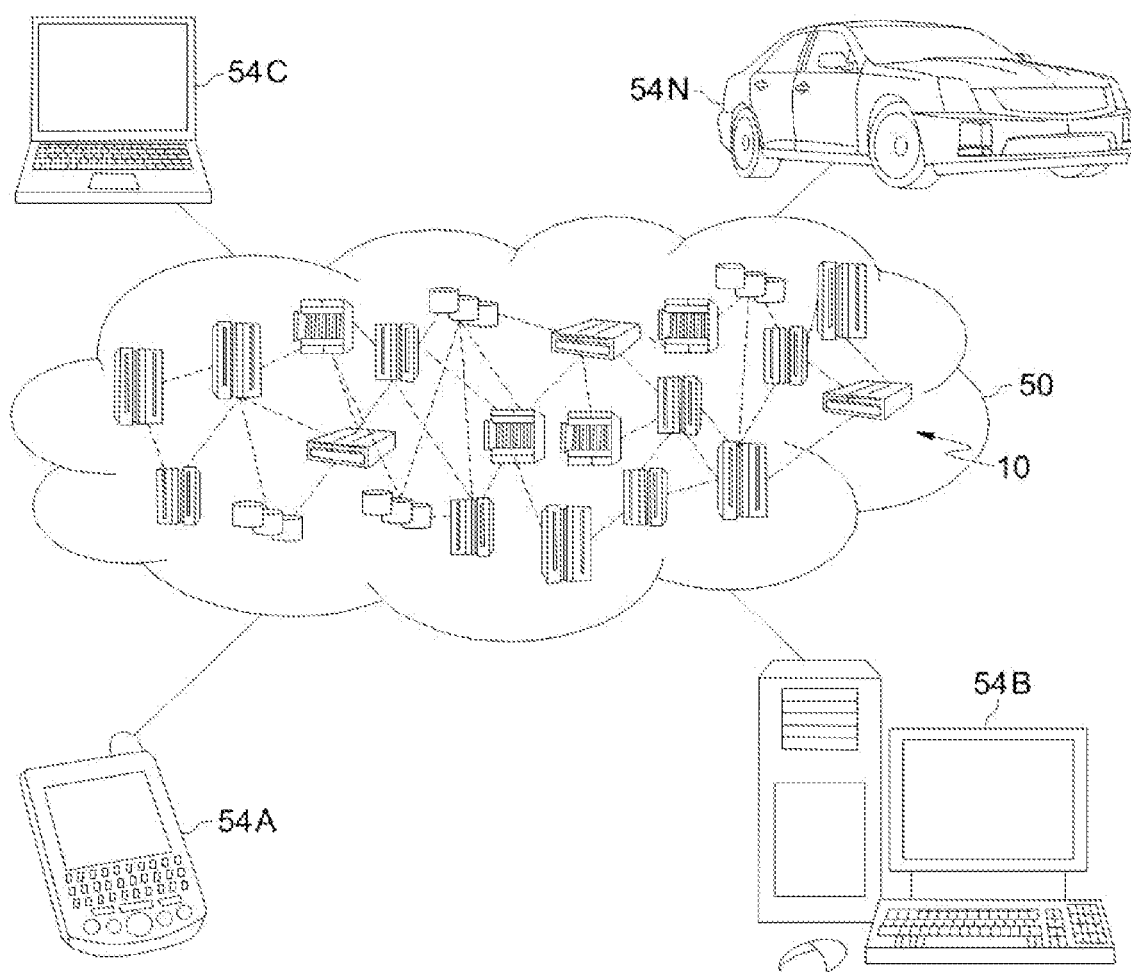
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
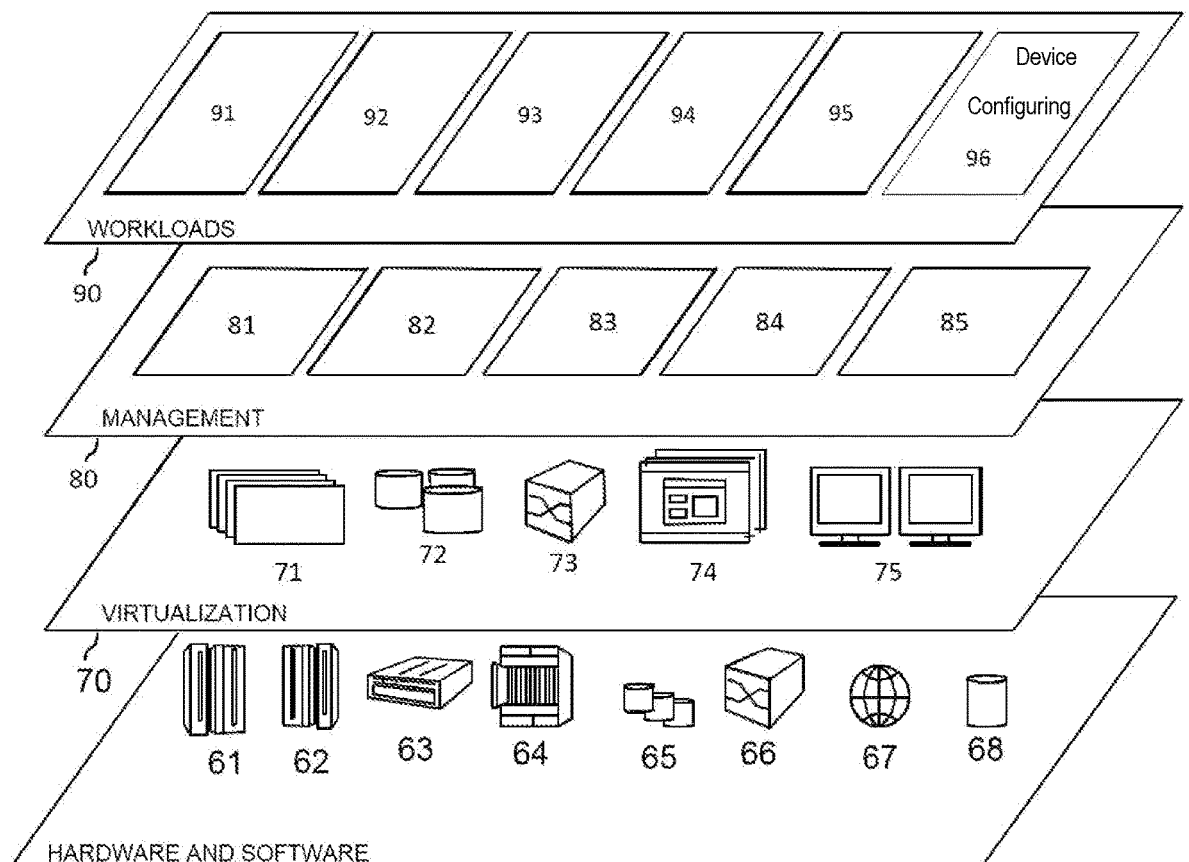
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device configuring 96.

Implementations of the invention may include a computer system/server 12 of FIG. 1 in which one or more of the program modules 42 are configured to perform (or cause the computer system/server 12 to perform) one or more functions of the device configuring 96 of FIG. 3. For example, the one or more of the program modules 42 may be configured to: a) receive device information for a user device and user environment devices from a user; b) send image templates to the user device using the device information; c) adjust device settings on the user device and the user environment devices in response to in response to a selection of an image template of the image templates; d) receive an image from the user device; e) compare the image to a target image; f) determine the image is acceptable; g) send the image to a third party; h) determine the image is not acceptable; and g) notify the user the image is not acceptable.

Figure 4:
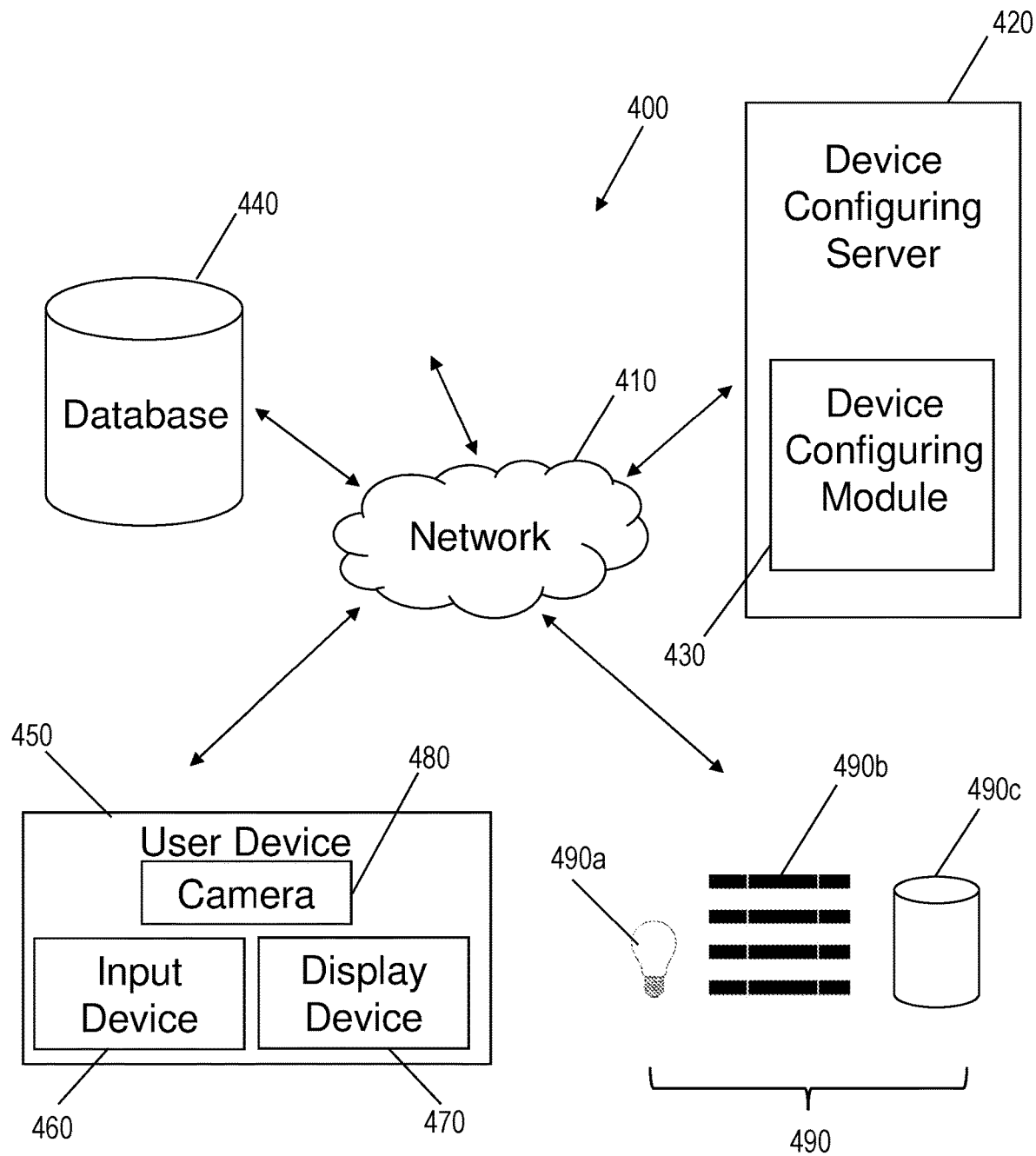
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, a device configuring server 420, a database 440, and a user device 450 having an input device 460, a display device 470, and a camera 480. In further embodiments, the environment 400 includes environment devices 490 including devices 490a, 490b, 490c.

In embodiments, the user device 450 includes one or more components of the computer system 12 of FIG. 1. In embodiments, the user device 450 may be a smartphone, laptop computer, desktop computer, smart watch, tablet computer, for example. In embodiments, the input device 460 includes a mouse, a keyboard, and a microphone, amongst other input device examples. In embodiments, the display device 470 is a screen which displays information to the user. In embodiments, the camera 480 is an image capturing computing device. In embodiments, the environment devices 490 are Internet of Things (IoT) computing devices. In further embodiments, the environment devices 490 include smart lights 490a, smart blinds 490b, and a smart hub 490c which controls the environment devices, amongst other IoT computing devices.

In embodiments, the device configuring server 420 includes a device configuring module 430, which comprises one or more program modules such as program modules 42 described with respect to FIG. 1. In embodiments, the device configuring server 420 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

The network 410 comprises one or more computer networks, such as one or more of a LAN, WAN, and the Internet. In one embodiment, the network 410 is representative of a cloud computing environment, such as described in FIG. 2.

In embodiments, a user, e.g., a healthcare patient, goes to a healthcare clinic to have images taken for diagnosing a medical condition. However, going to the healthcare clinic can be relatively time consuming, relatively expensive, and not always feasible for the user. In this way, a user may not visit a healthcare clinic until a later time, thereby possibly missing time for disease prevention. If the user does not visit a healthcare clinic, a healthcare provider may be unable to use video conferencing to remotely inspect a user's medical condition. Additionally, a healthcare provider may be unable to identify a medical condition from a user's own images because of a relatively poor quality of the user images, e.g., blurring, poor lighting, and other inabilities stemming from the user's device.

In embodiments, the device configuring module 430 allows for a solution to assist and guide users in capturing optimal images for a specific context based on user device specifications and user environment. In embodiments, the device configuring module 430 allows for capturing optimal images by receiving device information from the user device 450. In embodiments, the device configuring module 430 receives device information for the user device 450 and the environment devices 490 through the network 410 in response to the user entering the device information into the user device 450 using the input device 460. In alternative embodiments, the device configuring module 430 retrieves the device information for the user device 450 automatically without user input by accessing an operating system of the user device 450. In further embodiments, the device configuring module 430 retrieves the device information for the environment devices 490 automatically without user input by accessing the smart hub 490c.

In embodiments, the device information includes information for both the user device 450 and the environment devices 490. Examples of information for the user device 450 include camera specifications of the camera 480. Further examples of the camera specifications include camera modes, camera resolution, camera filters, and photo image settings (contrast, brightness, lighting, etc.). Further information for the user device 450 includes a make and a model of the user device 450 and an operating software of the user device 450. Examples of information for the environment devices 490 include a device type and a corresponding make and model.

In embodiments, in response to receiving the device information for the user device 450 and the environment devices 490, the device configuring module 430 sends image templates to the user device 450 through the network 410. In this manner, the device configuring module 430 causes the image templates to be displayed on the display device 470 of the user device 450. In embodiments, the device configuring module 430 retrieves the image templates from the database 440.

In embodiments, an image template corresponds to a target image for a specific image context and includes device settings for that target image. In embodiments, an image context is a medical context, a legal context, and/or a leisure context. In embodiments, the device configuring module 430 generates the target image and corresponding image template using machine learning models, e.g., generative adversarial networks (GANs), and training images. In embodiments, the training images represent different image contexts, e.g., training images representing a medical image context, training images representing a legal context, training images representing a leisure context. In embodiments, the training images further include information such as metadata regarding the type of device the training image comes from. For example, the metadata indicates that a particular image of a legal context of a specific legal document is from a particular smartphone at a specific light setting and at specific environmental settings, e.g., outdoor lighting. In embodiments, the training images are stored in the database 440. In embodiments, the training images are from the Internet and the user's own images taken, amongst other examples.

In embodiments, for a medical image context, the training images include information regarding medical conditions. For example, the training images for a medical image context include images of ailments illustrating the condition of a particular skin malady, e.g., melanoma. For a legal image context, these training images include information regarding legal situations. For example, the training images for a legal context include images of legal situations, e.g., a legal document. For a leisure image context, these training images include information regarding leisure situations. For example, the training images for a leisure context include images of social settings, e.g., a nature scene.

In embodiments, as the machine learning model analyzes the training images and the metadata, the device configuring module 430 generates a target image which represents an optimal image for a specific image context. In embodiments, for each target image, the machine learning model generates a corresponding image template which corresponds to a target image and includes device settings for the target image. In this way, each image template corresponds to a target image and contains pixel patterns and other data for that target image from analysis by the machine learning model of the device configuring module 430. Accordingly, as the machine learning model analyzes more training images, the machine learning model further refines the target images and the corresponding image templates.

In embodiments, using the metadata, the machine learning model organizes the target images and corresponding image templates in view of devices. As an example, the target image is an image of a specific legal document originating from a specific smartphone, and the machine learning model organizes this target image and corresponding image template for that smartphone. In embodiments, the target images, the image templates, and the device settings are all in the database 440. In this way, the database 440 includes a list of devices, such as smartphone and tablet models, with their device settings, and image templates which correspond to each device. In embodiments, the device configuring module 430 chooses which image template to send to the user device 450 using the device information of the user device 450. In this way, the image templates sent to the user are specific to the user device 450.

In embodiments, the device settings of the image template include device settings for the user device 450 and the environment devices 490. Specifically, the device settings of the image template include camera modes and settings for that image context, amongst other settings. Examples of the camera modes and settings include a portrait setting, a frame size setting, a zoom level setting, a lighting setting, an exposure setting, a contrast setting, and filter settings, amongst other device settings. As an example, an image template corresponds to a specific medical condition. As a specific example, the medical condition is melanoma. In this example, the image template includes the settings for a portrait mode, a relatively higher zoom level, and a relatively higher lighting level of the target image of a melanoma. In further embodiments, the device settings for the environment devices 490 include lighting settings of the smart lights 490*a*, amongst other device settings. In this way, the device settings include camera specifications of the camera 480, such as camera modes, resolution, filter availability, and photo image settings (e.g., contrast, brightness, and lighting).

In embodiments, in response to receiving a selection of an image template of the image templates from the user, the device configuring module 430 adjusts device settings on the user device 450 and the user environment devices 490 using the device settings of the image template. In embodiments, the user grants permission to the device configuring module 430 to access the device settings of the user device 450 and the environment devices 490. As an example, the user grants access to the device configuring module 430 to access: a) the camera settings of the camera 480; b) a text to speech functionality of the user device 450; c) a haptic feedback gyroscope of the user device 450; d) an accelerometer of the user device 450; and e) image depth sensors of the user device 450, amongst other device settings of the user device 450. In embodiments, the user also grants permission to the device configuring module 430 to access the device settings of the user environment devices 490, e.g., IoT enabled devices such as smart lights 490*a* and the smart blinds 490*b*, in the user's environment, e.g., home or work location.

In embodiments, in response to receiving access permission from the user, the device configuring module 430 accesses a virtual assistant of the user device 450 and the smart hub 490*c* to adjust the device settings of the user device 450 and the user environment devices 490. In embodiments, the device configuring module 430 adjusts the settings of camera specifications of the camera 480, including camera modes, resolutions, filters, and other photo image settings (e.g., contrast, brightness, and lighting). As an example, the user selects a medical condition image template for a skin malady. In this example, the device configuring module 430 changes a camera mode of the camera 480 to a portrait mode by accessing the smart assistant of the user device 450. Further, the device configuring module 430 adjusts a zoom on the camera 480 to a relatively higher zoom level by accessing the smart assistant. Additionally, the device configuring module 430 adjusts a lighting level of an environment of the user to be a relatively higher lighting level of the target image of a melanoma by adjusting a brightness of the smart lights 490*a* by accessing the smart hub 490*c*. As another example, the device configuring module 430 adjusts the smart blinds 490*b* to allow more sunlight to enter the user's environment and changes a filter setting on the camera 480 of the user device 450. In this way, the device configuring module 430 adjusts the ambient lighting environment. In further embodiments, the device configuring module 430 may further adjust the device settings of the user device 450 as the user takes images with the user device 450.

In embodiments, in addition to adjusting the device settings automatically, or as an alternative, the device configuring module 430 provides guidance to the user to adjust the device settings manually on the user device 450 and the user environment devices 490. In embodiments, the device configuring module 430 provides guidance to the user by various multi-sensory inputs. In embodiments, the guidance includes providing haptics on the user device 450, sending an audio message to the user device 450, sending a text to speech message to the user device 450, and/or sending a text message to the user device, amongst other inputs. As an example of haptics, the device configuring module 430 accesses a gyroscope of the user device 450 to activate a vibration feature to notify the user to change the device settings of the user device 450. As an example of an audio message, the device configuring module 430 provides an audio message through the network 410 for delivery by a microphone of the input device 460 of the user device 450, instructing the user to move away from a subject of the image they are taking, thereby guiding the user to move the device in space. In these examples, the device configuring module 430 guides the user using haptic and audio feedback to position the device according to the image template. In further embodiments, to determine a location of the user, the device configuring module 430 accesses gyroscope sensors and depth sensors in the user device 450.

In embodiments, for a text message, the device configuring module 430 displays a text message on the display device 470 of the user device 450. As an example, the device configuring module 430 displays a text message on the display device 470 of the user device instructing the user to adjust a zoom level to be relatively further out in response to a legal image context for a specific legal document.

In embodiments, for a leisure image context, as the adjusting the device settings on the user device 450 and the user environment devices 490 occurs, the device configuring module 430 explains to the user why the adjusting of the device settings on the user device 450 and the user environment devices 490 occurs. In this way, in response to a leisure image context, the device configuring module 430 provides the user with explanations for the device settings. In embodiments, the device configuring module 430 sends messages for display on the user device 450 explaining why these changes are occurring. As an example, for a leisure image context of a restaurant setting, the device configuring module 430 sends a text message to the user device 450 explaining why a lighting setting on the user device 450 is changing to match the device settings in the leisure image template to achieve the target image. As another example, the device configuring module 430 sends an audio message to the user explaining that the device setting of filter A is increasing to give more shadows and achieve a closer look to a target image of the leisure image template. As another example, the device configuring module 430 why the user environment devices 490 are adjusting to provide an ambient light because of the device settings in the leisure image template. In this way, the device configuring module 430 facilitates an educational and interactive experience by explaining to the user why changes are occurring and providing the user with explanations for the device settings.

In embodiments, the user takes images of an object of interest using the user device 450 and sends the images to the device configuring module 430 using the user device 450. In embodiments, the device configuring module 430 receives the images from the user device 450 through the network 410. In embodiments, the images from the user device 450 include at least one image or a plurality of images, for example.

In embodiments, the device configuring module 430 compares the images to the target image which corresponds to the image template. In embodiments, each target image contains patterns of pixels that offer an image signature of quality. In embodiments, the device configuring module 430 compares pixels within the images to the pixels within the target image to determine whether the images from the user device 450 are acceptable for the image context.

In embodiments, the determination of whether the images are acceptable is made by the device configuring module 430 using a threshold of acceptance. In embodiments, if a number of the pixels within an image match a threshold number of pixels within the target image, then the device configuring module 430 determines the image is acceptable. As an example, if the number of the pixels within the image match 80% of pixels within the target image, then the device configuring module 430 determines the image is acceptable. In this example, the 80% of the pixels within the target image are the threshold of acceptance. Alternatively, if a number of the pixels within an image do not match a threshold number of pixels within the target image, then the device configuring module 430 determines the image is not acceptable. As an example, if the number of the pixels within the image do not match 80% of pixels within the target image, then the device configuring module 430 determines the image is not acceptable.

In embodiments, in response to any of the images being acceptable, the device configuring module 430 sends each acceptable image to a third party. In embodiments, the third party may be a healthcare provider if the images are of a medical image context. As an example, if the acceptable images are of a skin malady, the device configuring module 430 sends the images to a dermatologist. In further embodiments, the third party may be an attorney if the images are of a legal image context. In even further embodiments, the third party is a friend in a contact list of the user if the images are of a leisure image context. In embodiments, the device configuring module 430 sends the images to the third party through the network 410.

In embodiments, the acceptable images are also sent to the machine learning model for further learning by the machine learning model. In this way, the machine learning model of the device configuring module 430 further learns from a user's interaction with the user device 450 and the user environment devices 490 by analyzing the acceptable images.

In embodiments, in response to all the images being not acceptable, the device configuring module 430 sends a notification message to the user that the all the images are not acceptable. In embodiments, the device configuring module 430 sends the notification message to the user through the network 410 for display by the display device 470.

Figure 5:
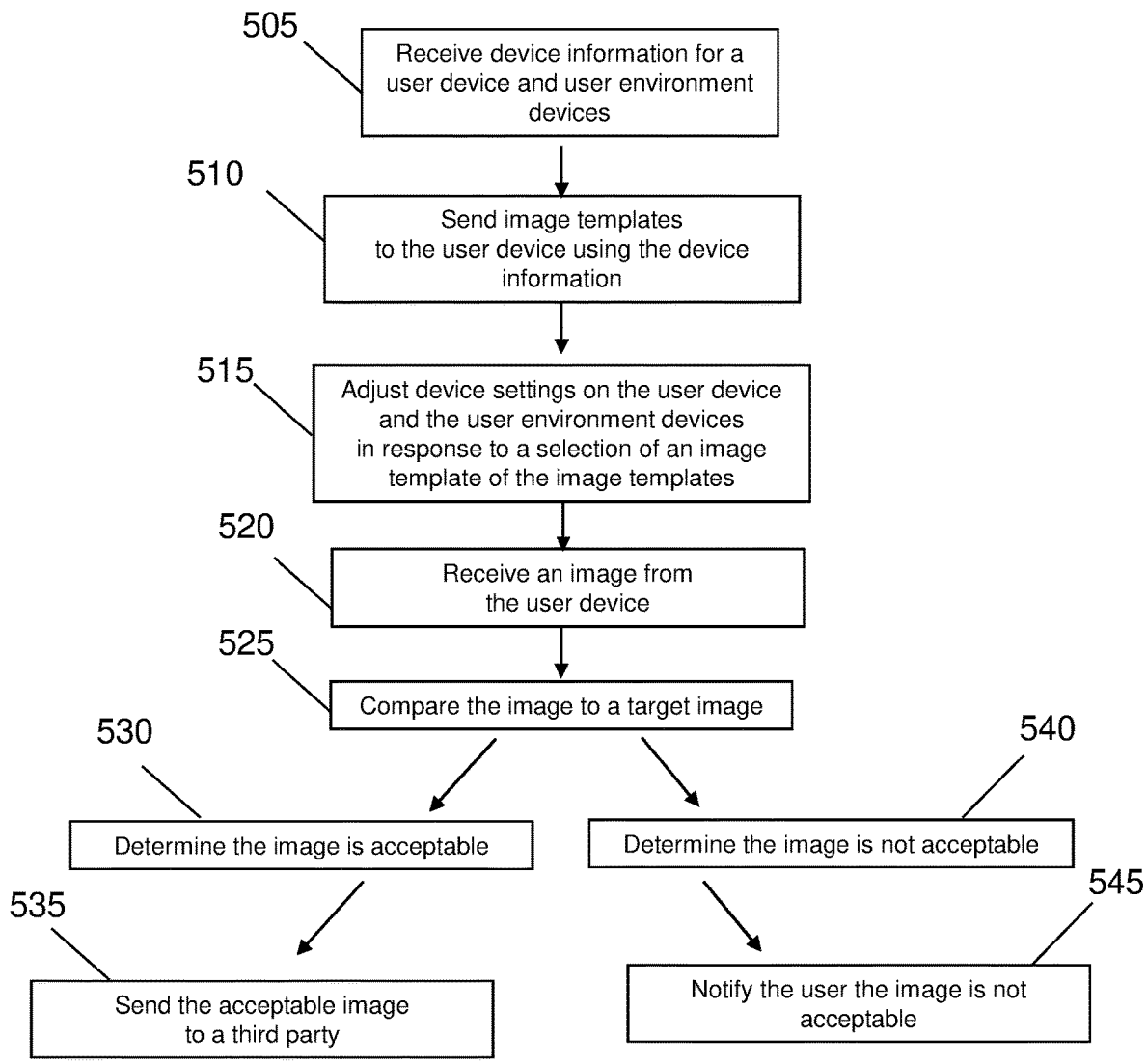
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the device configuring module 430 receives device information for a user device 450 and user environment devices 490. In embodiments, and as described with respect to FIG. 4, the device configuring module 430 receives the device information for the user device 450 and the user environment devices 490 through the network 410 in response to the user inputting the device information using the input device 460 of the user device 450. In alternative embodiments, the device configuring module 430 retrieves the device information for the user device 450 automatically without user input by accessing an operating system of the user device 450. In further embodiments, the device configuring module 430 retrieves the device information for the environment devices 490 automatically without user input by accessing the smart hub 490c.

At step 510, the device configuring module 430 sends image templates to the user device 450 using the device information. In embodiments, and as described with respect to FIG. 4, the device configuring module 430 generates the image templates using machine learning. In embodiments, the device configuring module 430 chooses which image templates to send to the user device 450 using the device information of the user device 450. In embodiments, the device configuring module 430 sends image templates to the user device 450 through the network 410 for display on the display device 470 of the user device 450.

At step 515, the device configuring module 430 adjusts device settings on the user device 450 and the user environment devices 490 in response to a selection of an image template of the image templates. In embodiments, and as described with respect to FIG. 4, in response to receiving access permission from the user, the device configuring module 430 accesses a smart assistant of the user device 450 and the smart hub 490c to adjust the device settings of the user device 450 and the user environment devices 490.

At step 520, the device configuring module 430 receives an image from the user device 450. In embodiments, and as described with respect to FIG. 4, the device configuring module 430 receives the image taken using the device settings from step 515 from the user device 450 through the network 410.

At step 525, the device configuring module 430 compares the image (from step 520) to a target image. In embodiments, and as described with respect to FIG. 4, the device configuring module 430 compares pixels within the image to the pixels within the target image to determine whether the image from the user device 450 is acceptable for the image context.

At step 530, the device configuring module 430 determines the image (from step 520) is acceptable. In embodiments, and as described with respect to FIG. 4, the device configuring module 430 uses a threshold of acceptance to determine whether the image is acceptable. In embodiments, if a number of the pixels within the image match a threshold number of pixels within the target image, then the device configuring module 430 determines the image is acceptable.

At step 535, in response to determining the image is acceptable, the device configuring module 430 sends the acceptable image to a third party. In embodiments, and as described with respect to FIG. 4, the device configuring module 430 sends the acceptable image to the third party through the network 410.

At step 540, the device configuring module 430 determines the image is not acceptable. In embodiments, and as described with respect to FIG. 4, the device configuring module 430 uses a threshold of acceptance to determine whether the image is not acceptable. In embodiments, if a number of the pixels within the image do not match a threshold number of pixels within the target image, then the device configuring module 430 determines the image is not acceptable.

At step 545, the device configuring module 430 notifies the user the image is not acceptable. In embodiments, and as described with respect to FIG. 4, the device configuring module 430 sends a notification message to the user that the image is not acceptable. In embodiments, the device configuring module 430 sends the notification message to the user through the network 410 for display by the display device 470.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, device information for a user device and user environment devices;
   sending, by the computing device, image templates to the user device using the device information;
   adjusting, by the computing device, device settings on the user device and the user environment devices in response to a selection of an image template of the image templates;
   receiving, by the computing device, an image from the user device;
   comparing, by the computing device, the image to a target image;
   determining, by the computing device, the image is acceptable; and in response to determining the image is acceptable, sending, by the computing device, the acceptable image to a third party.

2. The method of claim 1, further comprising receiving permission from the user device to access camera settings of a camera of the user device, a text to speech functionality of the user device, and a haptic feedback gyroscope of the user device in the adjusting the device settings on the user device.

3. The method of claim 1, further comprising adjusting the device settings on the user environment devices by adjusting a brightness of the user environment devices.

4. The method of claim 1, wherein the comparing the image to the target image includes comparing pixels within the image to pixels within the target image.

5. The method of claim 1, wherein the determining the image is acceptable includes determining a number of the pixels within the image matches a threshold number of pixels within the target image.

6. The method of claim 1, wherein the image is for an image context selected from the group consisting of a medical image context, a legal image context, and a leisure image context.

7. The method of claim 6, further comprising, in response to the leisure image context, providing a user of the user device with explanations for the device settings.

8. The method of claim 1, further comprising training a machine learning model with the acceptable image.

9. The method of claim 1, wherein the adjusting the device settings on the user device and the user environment devices includes providing guidance to a user of the user device to adjust the device settings manually on the user device and the user environment devices.

10. The method of claim 9, wherein the providing guidance to the user includes providing haptics on the user device, sending an audio message to the user device, sending a text to speech message to the user device, and sending a text message to the user device.

11. The method of claim 1, wherein the image template includes device settings for the target image.

12. The method of claim 1, wherein the computing device includes software provided as a service in a cloud environment.

13. A computer program product comprising one or more computer readable storage media having program instructions collectively stored on the one or more computer readable storage media, the program instructions executable to:
receive device information from a user device and from user environment devices;
send image templates to the user device using the device information;
adjust device settings on the user device and the user environment devices in response to a selection of an image template of the image templates;
receive an image from the user device;
compare the image to a target image;
determine the image is not acceptable; and
in response to determining the image is not acceptable, send a notification message to the user device.

14. The computer program product of claim 13, wherein the adjusting the device settings on the user device includes accessing a virtual assistant of the user device.

15. The computer program product of claim 13, wherein the program instructions are executable to train a machine learning model with training images.

16. The computer program product of claim 13, wherein the comparing the image to the target image includes comparing pixels within the image to pixels within the target image.

17. A system comprising:
a processor, a computer readable memory, one or more computer readable storage media, and program instructions collectively stored on the one or more computer readable storage media, the program instructions executable to:
generate image templates using a machine learning model;
send the image templates to a user device in response to receiving device information of the user device;
adjust device settings on the user device in response to a selection of an image template of the image templates;
receive an image from the user device;
compare the image to a target image;
determine the image is acceptable;
send the acceptable image to a third party; and
train the machine learning model with the acceptable image.

18. The system of claim 17, wherein the adjusting the device settings includes adjusting camera modes, resolutions, filters, a contrast, a brightness, and a lighting of a camera of the user device.

19. The system of claim 17, wherein the device information includes a make and a model of the user device and an operating software of the user device.

20. The system of claim 17, wherein the determining the images are acceptable includes determining a number of the pixels within the image matches a threshold number of pixels within the target image.

* * * * *